United States Patent [19]

Shaw et al.

[11] 3,899,573
[45] Aug. 12, 1975

[54] PRODUCTION OF FINE POWDERS

[75] Inventors: Henry Shaw, Scotch Plains; Derek J. Angier, Somerville, both of N.J.

[73] Assignee: Exxon Research and Engineering Company, Linden, N.J.

[22] Filed: Oct. 18, 1971

[21] Appl. No.: 190,055

[52] U.S. Cl. .............. 423/337; 423/325; 423/335; 423/608; 423/625; 423/636; 204/164
[51] Int. Cl. ...... B01k 1/00; C01b 33/18; C01f 7/02
[58] Field of Search ........... 204/164; 423/335, 337, 423/325, 608, 630, 635, 636, 625

[56] References Cited
UNITED STATES PATENTS

| | | | |
|---|---|---|---|
| 3,005,762 | 10/1961 | Fenn | 204/164 |
| 3,077,108 | 2/1963 | Gage et al. | 204/164 UX |
| 3,332,870 | 7/1967 | Ohrbach et al. | 204/164 |
| 3,642,453 | 2/1972 | Chilton et al. | 204/164 |
| 3,649,189 | 3/1972 | Kugler et al. | 204/164 X |
| 3,733,387 | 5/1973 | Kugler | 423/337 |

FOREIGN PATENTS OR APPLICATIONS

| | | | |
|---|---|---|---|
| 606,732 | 10/1960 | Canada | 204/164 |
| 683,522 | 3/1964 | Canada | 204/164 |

*Primary Examiner*—Edward Stern
*Attorney, Agent, or Firm*—Joseph J. Dvorak

[57] ABSTRACT

An improvement in comminuting particulate inorganic oxides is achieved by vaporizing the oxides in an electric arc column in the presence of a reducing agent and thereafter contacting the vapors with an oxygen containing quench gas. The process is particularly useful in preparing submicron silica powder.

8 Claims, 3 Drawing Figures

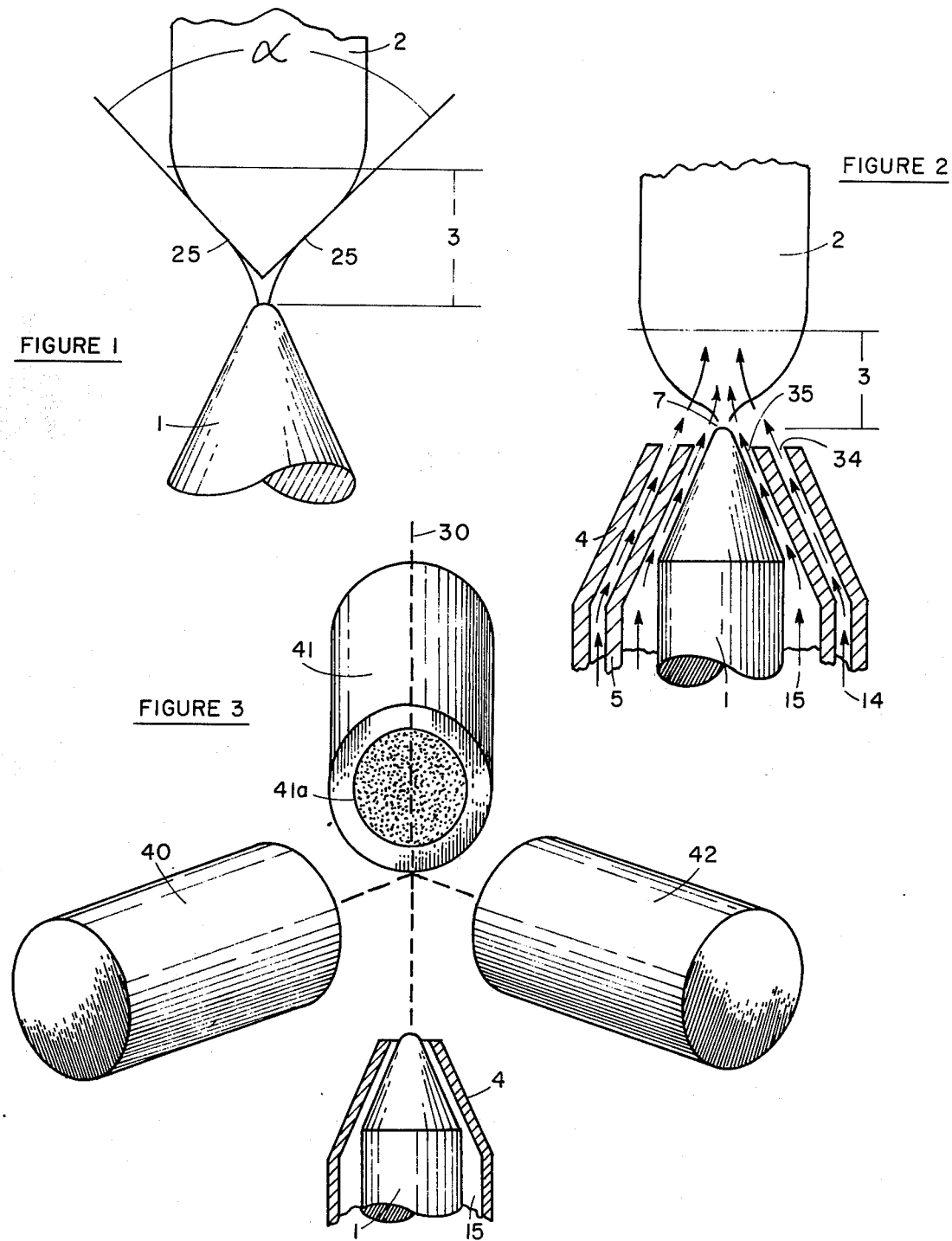

PRODUCTION OF FINE POWDERS

The generation and utilization of a gaseous plasma in performing chemical and physical transformations has been receiving ever-increasing commercial and scientific interest because of the ultra-high temperatures that can be reached in the plasma. Numerous devices have been developed providing plasma temperatures ranging up to 20,000°C. and even higher. Moreover, further strides have been made in the ability of maintaining a stability of the electric arc against the influence of vigorous forced convection of the feed material into the conduction column.

Among the chemical reactions that have been carried out in a plasma jet is the production of ultra-fine metal powders by reduction of the metal halides in a hydrogen plasma, and the carbothermic reduction of a refractory oxide to a metal carbide from the so-called high intensity arc discharge process.

Among the physical transformations that have been carried out in a plasma jet is the comminution of a wide variety of particulate materials by vaporization and subsequent recondensation to a finely-divided powder. A specific example is the production of finely divided silica powder by entraining particulate silica into an electrical discharge with a nitrogen gas stream and thereafter contacting the vaporous feed with quench gas.

SUMMARY OF THE INVENTION

The present invention provides an improved process for comminuting the size of the particulate inorganic oxide feed by vaporizing the feed in an electrical column in the presence of a reducing agent and thereafter contacting the vapors with an oxygen-containing quench gas.

The present invention is an improvement in making submicron powders such as silica powder in a plasma jet.

In a particularly preferred embodiment of the present invention, the particulate silica feed is forcefully projected into the conduction column of a free-burning arc discharge by entraining the silica feed in a hydrogen gas stream. Thereafter the arc effluent, containing reduced vaporous feed, is contacted with a cold stream of oxygen-containing quench gas. Preferably, the conduction column is stabilized by providing at least three anodes radially disposed around an extension of the cathode axis. Also, it is preferred to protect the cathode tip by interposing a stream of shielding gas between the cathode and the entrained solids.

By entraining the silica with hydrogen the energy rerequirements to vaporize the silica are lowered. Quenching the vaporized material with an oxygen-containing gas serves to reoxidize and condense the vaporized feed. Surprisingly, the combined features produce a material of enhanced brightness.

BRIEF DESCRIPTION OF THE DRAWINGS

FIG. 1 is a schematic diagram illustrating the arc column contraction of free burning electric arc in the vicinity of a cathode having a conical tip.

FIG. 2 is an enlarged cross-section of an apparatus useful in interposing a shielding gas between a cathode tip and a feed material.

FIG. 3 is a schematic diagram illustrating the particularly advantageous method of stabilizing a free-burning arc column by arranging three electrodes radially around an extension of the cathode axis.

DETAILED DESCRIPTION

Referring to FIG. 1, when an arc is struck between an anode (not shown) and a cathode having a conical tip, there occurs contraction in the current carrying area in the transition region between the cathode 1 and the conduction column proper 2. This contraction is indicated as contraction zone 3. This contraction of the current carrying area in the transition region between the cathode 1 and the column proper 2 may also be defined by the angle alpha, $\alpha$, which is determined by extending lines tangent to the column boundary at the points of inflection 25 of the contraction column. This contraction causes the natural cathode jet effect which will be explained subsequently.

The current density and therefore the self-magnetic field due to the arc current increases toward the cathode as a result of the contraction of the current carrying area. This nonuniform magnetic field exerts a body force on the electrically conducting plasma propelling it in a direction of maximum decrease in magnetic field, i.e. along the arc axis away from the cathode tip. The streaming of plasma away from the cathode tip decreases the local pressure in the immediate vicinity of the cathode tip. The pressure decrease causes the arc to aspirate gas from the surrounding atmosphere. This mechanism establishes the well known, natural cathode jet which has been observed to flow along the axis of the column away from the cathode tip in all arcs characterized by a contraction zone adjacent to the cathode.

In view of the fact that there exists an inwardly directed pressure gradient in the vicinity of the cathode tip, contraction zone 3 can serve as an "injection window" through which materials may be injected directly into the arc column. Indeed, it has been found that the flow rates of the magnitude much greater than that aspirated naturally can be injected into the column through the injection window without disturbing the stability of the arc. In short, the injection of a copious stream of working fluids such as a reactive gas, and/or solids entrained in a reactive gas, into the column through the injection window is not only possible, but actually increases the heat transfer effectiveness of this part of the arc. Consequently, it is a preferred feature of the present invention in feeding particulate inorganic oxides into the conduction column of an arc discharge that the particulate feed be entrained in a gas and forcefully projected in a direction substantially parallel to the conical cathode surface through the injection window. By utilizing this technique, practical amounts of material can be fed into the high temperature region of the arc discharge.

Since many materials tend to physically or chemically attack the conical tip of the cathode, it is desirable to protect or shield the cathode to maintain its integrity. Protection is afforded by interposing a stream of shielding gas between the feed material and the conical tip of the cathode.

By shielding gas is meant any gas which is not active, i.e., chemically reactive toward the cathode material, at prevailing cathode temperatures during arc operation. Typical shielding gases, especially with tungsten electrodes, are the following: helium, argon, neon, krypton, nitrogen and hydrogen.

A convenient apparatus for interposing the shielding gas between the cathode and the feed material is shown in FIG. 2. Shielding gas is introduced via passage 15 while feed material is introduced via passage 14. The passage defining shrouds 4 and 5 form concentric orifices 34 and 35 through which fluid media can be fed into the arc column.

In order to provide a sufficient residence time for the feed powder in the conduction column, it is desirable to provide a well-defined conduction column and unidirectional tail flame. In the practice of the present invention, preferably this is obtained by arranging three anodes radially around an extension of the cathode axis and dividing the anode current equally among the three anodes so that the anode jets merge smoothly with the cathode jet to form a single effluent stream along the extension of the cathode axis. Illustrative of this particular arrangement is FIG. 3, wherein three fluid transpiration anodes are arranged symetrically on a plane perpendicular to the extension of the cathode axis shown as broken line 30. The fluid transpiration anode is a porous anode through which gas transpires and emerges into the anode sheath. As shown in FIG. 3, anode 41 has a porous surface 41a through which gas may be fed. In general, the gas stream transpirated through this anode should be one which will not react with the vaporized particulate feed material; however, in the instant process the reducing gas in whose presence the vaporization reaction is conducted may be employed. Gases that are suitable for transpiration through the anodes include helium, argon, nitrogen and hydrogen.

While the present invention is being illustrated with fluid transpiration anodes non-consumable anodes or consumable carbon anodes may be employed. Indeed, if the vaporization is to be conducted in the presence of carbon as a reducing agent, a carbon consumable anode could be employed to great advantage. However, use of a consumable carbon anode as the source of reducing agent in the conduction column is not particularly preferred.

The number of anodes also can be varied. For example, a single anode in the shape of an annular band can be employed.

Any particulate inorganic oxide feed may be projected into the high temperature region of the conduction column and there vaporized. Typical of such materials are silica, magnesia, zirconia, alumina and the like. Since solids are entrained in a gas stream, it is preferable that solid feed material have particles below 80 microns in size, preferably the particles ranging in size from about 50 to 70 microns. The particles having these ranges of sizes are generally available in the trade, for example, sand having particle sizes ranging from 50 to 80 is commercially available and can be used in the production of submicron size silica.

As previously indicated, the particulate inorganic oxide feed can be entrained in a carrier gas, such as argon or nitrogen and projected into the arc column via the injection window. Since the vaporization of the inorganic oxide solid in the conduction column must be conducted in the presence of a reducing agent. According to this invention, the reducing agent may be introduced simultaneously with the inorganic oxide feed.

The reducing agents contemplated by the present invention include hydrogen or lower aliphatic hydrocarbons, i.e. having carbon content ranging from $C_1$ to $C_{15}$, and carbon. Particularly preferred is hydrogen. Indeed, when the reducing agent is a gas, it can be used to entrain the solid feed material into the conduction column. The presence of the reducing agent permits a significantly lower temperature at which the oxide will vaporize and crack. For example, silica will crack to silica monoxide in an argon atmosphere at 4,000°K whereas if argon is used to entrain carbon and silica into the plasma, dissociation of the silica to silica monoxide vapor goes to completion at 2,300°K. Thus, conducting the vaporization of the particulate inorganic oxide at feeds in the presence of a reducing agent is an essential feature of the present invention.

As previously indicated, by arranging the anodes radially around an extension of the cathode axis, a stabilized conduction column with a unidirectional tail flame is obtained thereby assuring that the residence time of the powder in the plasma is sufficient for complete vaporization of the feed. Contacting the vaporized feed at the end of the tail flame with an oxygen-containing quench gas results in reoxidation of the reduced feed, e.g. silica monoxide is reoxidized to silica and the vaporized material is condensed in very finely divided form. Any oxygen-containing as may be used but it is particularly advantageous in the practice of the present invention to use air.

The powder in the quench product gas may be separated by conventional means such as cyclone filter bags and electrostatic precipitators and the like. The recovered powder-free gas can be recompressed and recycled for use in the plasma and/or in the quench gas streams, if not burned or otherwise discarded.

In the practice of the invention silica was comminuted in a conduction column generated by a conical cathode and three fluid transpiration anodes arranged in the geometry as illustrated in FIG. 3. Hydrogen was used as the working gas as well as the powder carrier and shielding gas. Air was used as a quench gas and a white quartz sand powder (−170/+270 mesh size) was used as feed to produce submicron silica powder. For comparison, data from another run using argon solely as the working gas and powder carrier gas is given in the table below which also lists the parameters and results of these tests.

TABLE I

| Parameters | Run 1 | Run 2 |
|---|---|---|
| Arc current, amps | 360 | 360 |
| Arc voltage, volts | 100 | 145 |
| % of Power used in Arc | 87 | 87 |
| Arc gap, startup | 1/4 | 1/4 |
| Arc gap, operation | 6" | 6" |
| Gas flows | | |
| Anode gas, argon standard cubic ft/hr. | 110 | 110 |
| Shielding and powder gas carrier | Ar | $H_2$ |
| Shielding and powder gas carrier flow standard cubic feet/hour | 30 | 52 |

TABLE I - CONTINUED

| Parameters | Run 1 | Run 2 |
|---|---|---|
| Quench gas, air standard cubic ft/min. | 20 | 20 |
| Feed powder rate, −170/+270 mesh silica, pounds per hour | 7 | 7 |
| Consumed kilowatt hours per pound of product | 14 | 10 |
| % Feed vaporized | 32 | 65 |
| Particle size range, μ | .005–0.05 | .005–0.05 |

As can be seen from the foregoing data, the comminution of the inorganic oxide solids in the presence of the reducing agent makes it possible to operate the process at lower specific power. Additionally, it has been discovered that the process of the present invention provides a cleaner product. This is demonstrated in the table below where Munsell's Value, a measure of the brightness of the sample compared with the brightness of the standard, is given for products having different origins. The values were obtained using a Model D-1 Color Eye sold by Kollmorgen Corporation. Given in the table is the Munsell Value of a commercially available silica produced by burning silica tetrachloride in the presence of hydrogen and oxygen.

TABLE II

| Source of Silica | Munsell's Value |
|---|---|
| Plasma jet with hydrogen | 90.1 |
| Plasma jet with argon | 85.1 |
| Commercially available material | 88.5 | what is claimed is:

1. In the process of comminuting a particulate inorganic oxide by vaporizing the inorganic oxide with a plasma jet and subsequently recondensing the vaporized inorganic oxide, the improvement comprising:

providing a free burning arc discharge between an anode and a cathode having a conical tip whereby said arc discharge forms a contraction zone of current-carrying area in the transition region in the vicinity of the cathode;

forcefully projecting a particulate inorganic oxide along said conical tip of said cathode into and through said contraction of the current-carrying area into said arc discharge while simultaneously forcefully projecting a reducing agent along said conical tip of said cathode into and through said contraction of the current-carrying area into said arc discharge; and, thereafter contacting the vapors with an oxygen containing quench gas.

2. The process of claim 1 wherein the reducing is selected from the group consisting of hydrogen, aliphatic hydrocarbons and carbon.

3. A process of claim 1 wherein the oxygen-containing gas is air.

4. The process of claim 1 wherein the reducing agent is hydrogen.

5. The process of claim 1 wherein said particulate inorganic oxide feed is silica.

6. The process of claim 1 wherein said inorganic oxide is selected from oxides of silica, magnesia, zirconia and alumina.

7. The process of claim 1 wherein said particulate inorganic oxide has a particle size below 80 microns.

8. The process of claim 1 wherein said inorganic oxide is entrained in said reducing agent and forcefully projected along said conical tip of said cathode.

* * * * *